Figure 1:
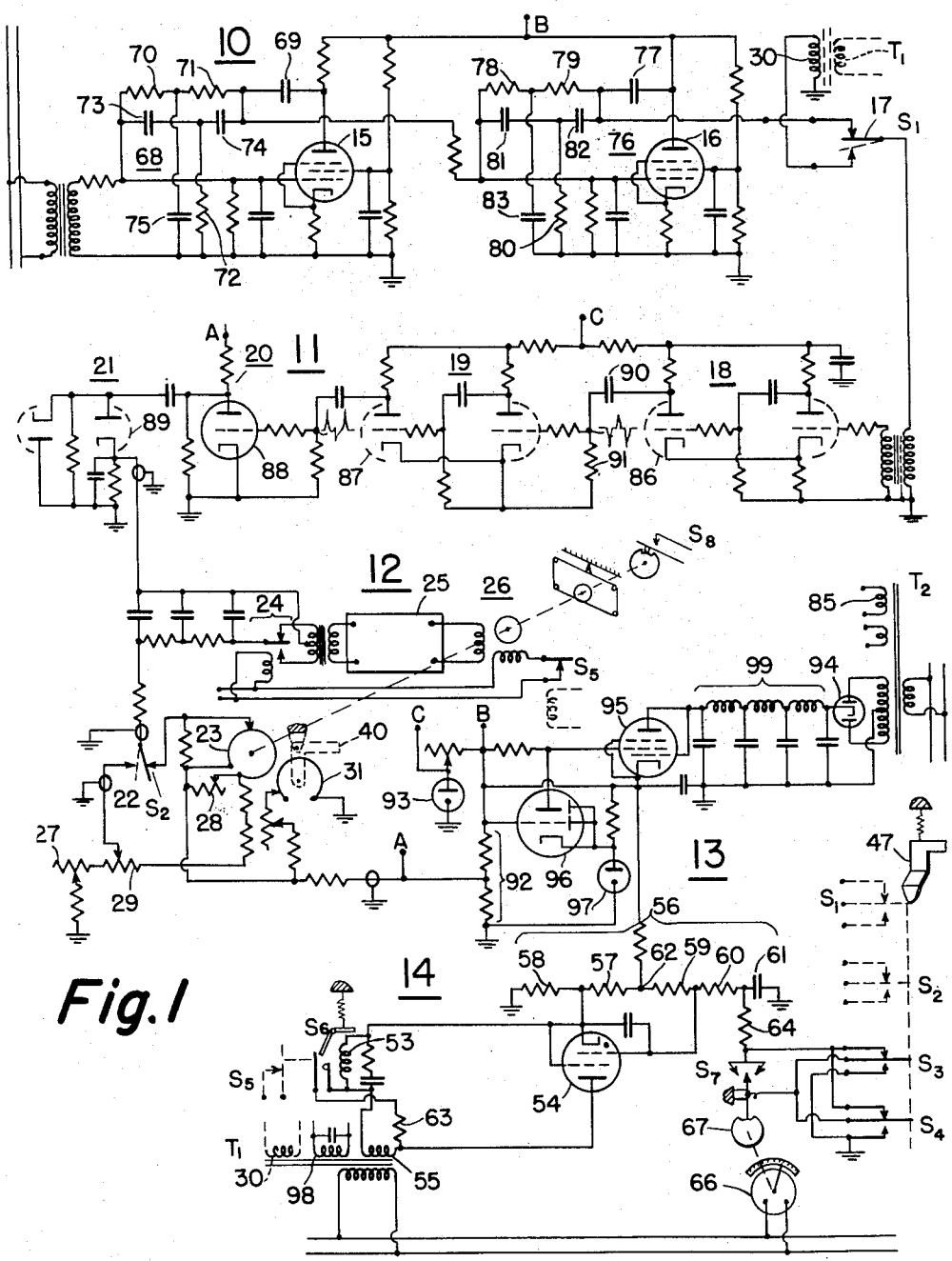

Sept. 9, 1952 W. E. PHILLIPS ET AL 2,610,311
SELF-BALANCING, SELF-STANDARDIZING MEASURING SYSTEM
Filed March 14, 1950 2 SHEETS—SHEET 1

INVENTORS
WILLIAM EARL PHILLIPS
EDWARD J. CRANCH
BY
Woodcock and Phelan
ATTORNEYS Sept. 9, 1952 W. E. PHILLIPS ET AL 2,610,311
SELF-BALANCING, SELF-STANDARDIZING MEASURING SYSTEM
Filed March 14, 1950 2 SHEETS—SHEET 2

INVENTORS
WILLIAM EARL PHILLIPS
EDWARD J. CRANCH
BY
Worderck and Phelan
ATTORNEYS Patented Sept. 9, 1952

2,610,311

UNITED STATES PATENT OFFICE 2,610,311

SELF-BALANCING, SELF-STANDARDIZING MEASURING SYSTEM

William Earl Phillips, Drexel Hill, and Edward J. Cranch, Bryn Athyn, Pa., assignors to Leeds and Northrup Company, Philadelphia, Pa., a corporation of Pennsylvania Application March 14, 1950, Serial No. 149,612

8 Claims. (Cl. 318—28)

This invention relates to self-balancing, self-standardizing systems for indicating, recording or controlling the magnitude of a condition and particularly concerns high-speed instruments of this type in which an electric motor is utilized for effecting rebalancing adjustment of the measuring and standardizing impedances of the system.

In accordance with one aspect of the invention, the measurement standard is monitored and if it is not found correct within prescribed narrow limits, the rebalancing motor is disabled during the subsequent standardizing period or periods to preclude any restandardizing until correction of the deficiency of the standard.

In accordance with another aspect of the invention, the recorder or controller is temporarily desensitized, as by disabling of its rebalancing motor, during the transitions between measuring and standardizing so to avoid the effect upon the record, or upon the control action, of the switching transients incident to the transfer from or to standardizing. More specifically, a time-delay network, under control of intermittently operated switches which effect the transfer from measuring to standardizing, is effective to disconnect the rebalancing motor for a short interval at the beginning of the successive measuring and standardizing periods and reconnection of the motor in the standardizing periods is dependent upon whether or not the standard is then within the aforesaid prescribed limits.

In accordance with another aspect of the invention, the recorder, or other measuring instrument, is preceded by electronic circuits which convert signals of a frequency varying as a function of the magnitude of the condition to be measured into direct current of corresponding magnitudes and compensation for changes in the operating characteristics of the tubes or circuit elements is effected by frequent application of signals of a standard frequency so to produce, for restandardization of the recorder, a direct current standard of magnitude dependent upon the then existing characteristics of the electronic tubes.

The invention further resides in systems and combinations having the features of novelty and utility hereinafter described and claimed.

For a more detailed understanding of the invention, reference is made to the accompanying drawings, in which:

Fig. 1 is a circuit diagram of a measuring system embodying the invention; and

Figure 2:
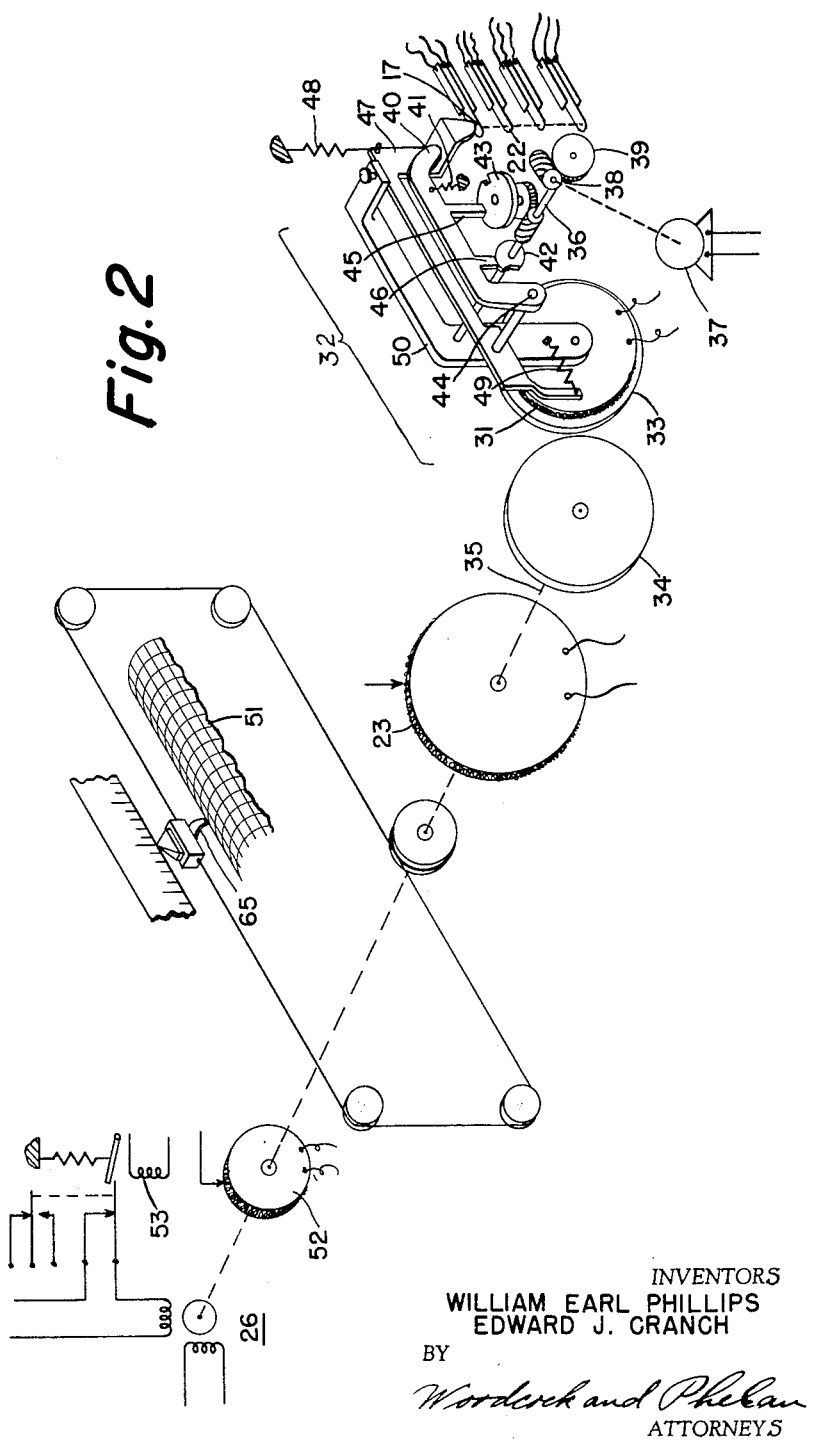

Fig. 2 in part in perspective and in part schematic, shows a measuring instrument and associated components utilizable in the system of Fig. 1.

As exemplary of a high-speed indicator-recorder-controller system having all of the foregoing features, as well as others later herein mentioned, there is herein described a telemetric receiver suited for use in a power-generating station, there to indicate or record, or control in response to, the changes in tie-line load occurring at a remote point in a power distribution system in part supplied by the station.

It is also specifically assumed, for purpose of explanation, that the tie-line load information is transmitted to the generating station over a communication circuit such as by a carrier frequency impressed upon the power circuit in the form of signals of a frequency which is varied at the remote transmitting point as a function of the tie-line load. The magnitude and waveform of the transmitted signal are or may be substantially affected by line conditions between the transmitter and receiver.

The complete telemetric receiving system shown in Fig. 1 includes a band-pass filter 10, a pulse converter 11, a high-speed self-balancing measuring instrument 12, a power supply 13 for the receiver components, and a time-delay network 14. The preferred form of each of these components is shown and later fully described, although it is to be understood that other equivalent forms of each may be substituted.

The band-pass filter 10 passes the transmitted signal, whose frequency in the specific case assumed may vary within the range of from approximately 80 to 100 cycles, and substantially eliminates other frequencies including extraneous pickup frequencies and the power-line frequency which ordinarily is 60 or 25 cycles. The filter 10 also includes amplifier tubes 15 and 16 which are in degenerative circuits, as later more fully described, so that network 10 serves also as a limiter amplifier affording a substantially constant output throughout a wide variation of signal input voltage. With the tubes and circuit constants later given, the output is constant at 11 volts plus or minus 0.5 volt throughout a range of 0.5 to 13 volts input.

With the movable contact 17 of switch $S_1$ in the "measuring" position shown in Fig. 1, the amplified transmitted signal is impressed upon the input circuit of the electronic converter 11 which essentially consists of two wave shaping amplifier stages 18, 19, an amplifier stage 20 and an output rectifier 21. The output of the converter 11 is a direct-current of magnitude uniquely corresponding with the frequency of the transmitted signal and substantially unaffected by changes in magnitude or waveform of the received signal.

With the movable contact 22 of switch S₂ in the "measuring" position shown in Fig. 1, any unbalance between the direct-current output of the converter 11 and the effective output voltage of a measuring network including the slidewire 23 is changed to alternating current of power-line frequency by the vibrating reed converter 24, or equivalent, for amplification by an alternating current amplifier 25. The amplified unbalance, as appearing in the output circuit of amplifier 25 is applied to the rebalancing motor 26 which moves slidewire 23 in the proper direction and to proper extent to effect null input of the amplifier 25. In the particular form illustrated, the motor 26 is a two-phase motor, one of whose windings is energized by the output of amplifier 25 and another of whose windings is energized from the same source used for energization of the coil of the vibratory converter 24. Both sources are usually, for convenience, energized at power-line frequency. For illustration of other high-speed measuring instruments, reference may be had to United States Letters Patent 2,113,928, 2,113,164 and 2,367,746. During the measuring periods, the switch S₅, in an energizing circuit of motor 26, is closed, as shown in Fig. 1.

The fixed or standard current traversing the potentiometer slidewire 23 is supplied from a suitably regulated source 13 later specifically described. In initial calibration of the instrument, the calibrating rheostat 27 in series with slidewire 23 and the supply source 13, is adjusted for balance of the measuring system at 80 cycles. The calibrating rheostat 28 in shunt to slidewire 23 is adjusted for balance of the measuring circuit at 100 cycles. These two calibrating points are determined with the movable contact 22 of switch S₂ in the "measuring" position shown in Fig. 1 and with inputs of 80 and 100 cycles applied to the input terminals of converter 11. This procedure is repeated until the system is at balance at each frequency. With the movable contact 22 of switch S₂ moved to the dotted-line or "standardizing" position, the movable contact of calibrating potentiometer 29 is adjusted for balance of the measuring system at a standard frequency, for example, the power-line frequency of 60 cycles. The movable contacts of switches S₁ and S₂, as more clearly shown in Fig. 2, are ganged for actuation in unison so that in subsequent normal use of the instrument both are simultaneously in "measuring" position or "standardizing" position.

Upon actuation of the contact 17 of switch S₁ to the "standardizing" position indicated by broken lines, the input of the converter 11 is transferred from the band-pass filter 10 to a source of standard frequency, specifically to the secondary winding 30 of a transformer T₁ energized from the power line or other source of standard frequency. If the output voltage of the converter 11 does not balance the potential of the movable contact of potentiometer 29, as may occur because of change in characteristics of the converter tubes, the motive means, motor 26 is effective to adjust the standardizing slidewire 31 to change that fraction of the output current from supply source 13 which traverses both the measuring slidewire 23 and the series potentiometer 29.

With the measuring slidewire current so restandardized, the settings thereof correspond with the initial calibration for accurate measurement in the subsequent measuring period of the magnitude of the measured variable, specifically tie-line load, system frequency or other condition of the power-distribution system. The restandardizing adjustment of slidewire 31 by motor 26 may be effected by the mechanism 32 shown in Fig. 2 and more fully disclosed and claimed in Ross et al. Patent 2,113,069.

In brief, during the measuring periods the drum 33, rotatable with the movable element of slidewire 31, is out of engagement with the drum 34 on shaft 35 driven by motor 26, so that no adjustment of the standardizing slidewire 31 is effected during any measuring period.

Driving engagement between drums 33 and 34 during the standardizing periods is effected by the mechanism now specifically described. The shaft 36 of the mechanism 32 is continuously driven from the synchronous motor 37 or other timing device through a suitable reduction train 38—39. Motor 37 may also be used to feed the record sheet 51 adjacent the path of the recorder stylus 65, Fig. 2. The arm 40 is biased for rotation in clockwise direction about its pivot 44 by the powerful spring 41 but is precluded from so rotating during the measuring interval by the cam 42 and the notched disk 43. When the projection 45 of arm 40 is in alignment with the notch in the slowly turning disk 43 and the projection 46 of arm 40 rides off the high part of cam 42, the spring 41 moves arm 40 in clockwise position from the position shown in Fig. 2 to move the movable contacts of switches S₁ to S₄ to the "standardizing" position. This clockwise movement of arm 40 also rocks arm 47 against its biasing spring 48 to tension the spring 49 which interconnects arm 47 and the supporting arm 50 for slidewire 31 and its driving drum 33.

Thus, concurrently with actuation of the switches S₁, S₂ of the converter and measuring circuits to "standardizing" position, there is effected a temporary mechanical coupling between the drums 33 and 34 so that motor 26 is effective to effect rebalancing adjustment of slidewire 31, if there is need for restandardization.

At the end of each standardizing interval, which is short compared to the preceding and following measuring intervals, the arm 40 is restored to the position shown in Fig. 2 by the cam 42, whereupon the slidewire drum 33 is returned to the position shown in Fig. 2 by spring 48. At the same time, the movable contacts of switches S₁ to S₄ under their own bias, or by supplemental bias not shown, return to the "measuring" position.

As thus far described, the transients incident to actuation of the switches S₁ and S₂, from measuring to standardizing or from standardizing to measuring, would cause brief operation of motor 26 and so produce a jog in the trace recorded on recorder sheet 51, and an undesired actuation of the control slidewire 52, Fig. 2, or the control switch S₃, Fig. 1.

These undesired effects of the switching transients are avoided by recourse to the time-relay network 14 which precludes energization of the motor 26 during and for a short period following the transitions of the receiver between the standardizing and measuring conditions. Specifically, the motor switch S₅ is controlled by a translating device relay 53 in the anode circuit of a thyratron or other gas discharge tube 54 of the delay network. The relay current may be supplied by the secondary winding 55 of the transformer T₁. The grid-cathode bias of tube 54 is derived from a network 56 supplied with direct current from the source 13. The cathode of tube 54 is connected in one branch of the network 56 between the resistors 57, 58 and the grid of tube 54 is connected in another shunt branch of the network including resistors 59, 60 and a capacitor 61. Except under conditions later specified, the capacitor 61 is charged substantially to the potential of terminal 62 of the network and the average of the current pulses passed by the thyratron is sufficient to maintain the coil of disabling relay 53 energized at a value for which the motor contacts S₅ are maintained closed. Thus, during the relatively long measuring periods, the motor 26 is continuously effective to respond to any changes in frequency of the signal and to indicate or record the changes in tie-line load or other variable. Just prior to and during actuation of the switches S₁ and S₂ from the measuring to the "standardizing" position, the switches S₃ and S₄ are effective to short-circuit the condenser 61 until S₁ and S₂ have reached the "standardize" position and so provide an interval of ten seconds or so, following the completion of the switching operation during which the tube 54 is nonconductive. During this interval, the relay 53 is deenergized and the motor switch S₅ is open. Accordingly, the motor 26 is incapable during this time to respond to amplifier 25 and the switching transients neither appear on the record sheet 51 nor produce any upset in an associated control circuit, such as shown in copending application, Serial No. 149,613, including slidewire 52 or switch S₈.

During this interval of non-conduction of tube 54, the relay switch S₆ is closed to complete a load circuit including resistor 63 for the secondary winding 55 of transformer T₁. Thus, the load on this transformer, which also supplies the heater current for the tubes of converter 11, is maintained constant and the disabling or reconnection of tube 54 does not cause a spurious change in output of converter 11.

Reverting to the temporary short-circuiting of condenser 61 of time-delay network 56, when the switches S₃ and S₄ are in "standardizing" position, the discharge path through resistor 64 is open. These switches are of the make-before-break type, so that as the movable contacts are moved downwardly from the position shown in Fig. 1, they engage the lower grounded contacts before separating from the upper contacts, thus momentarily completing a discharge path for capacitor 61 through the resistor 64. Shortly thereafter the movable contacts disengage the upper fixed contacts, so reopening the discharge path. Thus, with the switches S₃ and S₄ in "standardizing" position, the condenser 61 is recharged, the grid biasing potential of tube 54 returning to its normal value after an interval of say ten seconds or so. Consequently, for the major part of the standardizing periods, which may each be about thirty seconds long, the motor 26 is effective to effect restandardizing adjustment of the slidewire 31.

In like manner, at the end of each standardizing interval, prior to the switches S₃ and S₄ leaving the "standardizing" position, there is formed a discharge path for condenser 61 until S₁ and S₂ have reached the "measuring" position so that following the completion of the switching operation, for a short interval of ten seconds or so, the motor switch S₅ is open in avoidance of any effect of the switching transients upon the indicating, recording or control functions of the high-speed instrument 12. Therefore, for the major part of the relatively long measuring periods, which may each be a half or three-quarters of an hour long, the motor is effective for rebalancing adjustments of the measuring slidewire 23.

In the system thus far described, restandardization could occur even though the standard was of incorrect magnitude. Specifically, the instantaneous power-line frequency used for standardizing in the particular installation herein described may sometimes be above or below the normal frequency of 60 cycles. Even in power systems whose integrated frequency is held rigid for time-indicating purposes, it is sometimes necessary to hold the instantaneous frequency above or below normal for appreciably long times for reasons which need not here be explained. To prevent restandardizing of the receiver when the line-frequency or other standard is not within prescribed narrow limits, there is provided a switch S₇ which is effective to desensitize the recorder 12 or its motor 26 during any part of the standardizing interval for which the standard is above or below proper limit values and for a period of seconds following the return of the standard within the narrow limits. Specifically, in the particular arrangement shown in Fig. 1, the switch S₇ is connected in shunt to the normally closed measuring contacts of switch S₃ and of switch S₄. Consequently, during the measuring periods of the instrument 12, it is of no moment whether the switch S₇ be open or closed. During the transition from measuring to standardizing or standardizing to measuring, the discharge path for condenser 61 is completed whether or not the switch S₇ is open or closed and consequently there is always afforded the aforesaid delay of ten seconds or so both in the measuring and standardizing intervals for which the motor 26 is deenergized. If, however, during any part of a standardizing period the switch S₇ is closed, because of subnormal or abnormal value of the standard, the discharge path about condenser 61 is established through switch S₇ so long as the standard is of improper magnitude within that interval, and consequently the relay 53 remains deenergized and the circuit of motor 26 remains open to preclude any adjustment of the standardizing slidewire 31 for the interval when the standard is of improper magnitude and for ten seconds after it has returned and remained at its desired value. At the end of each standardizing interval, the switches S₃ and S₄ open the discharge path of condenser 61 whether or not switch S₇ is closed, and after the time-delay required for recharging of condenser 61, the measuring network and its motor 26 are again effective to resume measuring operation with the standard current through slidewire 23 of the value predetermined by the last and correct standardizing operation.

In the particular arrangement illustrated for which the power-line frequency is used as a standard for the measuring system, the desensitizing switch S₇ is positioned by a frequency-meter or recorder 66 such as used in most modern generating stations. Specifically, the movable element of switch S₇ may be actuated by a control cam 67, or equivalent, connected to the movable element of the frequency-meter for closure of switch S₇ when the line-frequency is outside of the narrow limits suited for standardizing purposes. By way of example, the switch S₇ may be set to close for frequencies below 59.95 cycles and above 60.05 cycles.

By way of specific example and supplemental discussion of the band-pass filter 10, the tubes

15 and 16 may be of the 6SJ7 type. The parallel T network 68 degeneratively couples the input and output circuits of tube 15, the blocking condenser 69 providing the coupling to the anode circuit of the tube. The circuit constants of network 68 are so chosen that a frequency of 82 cycles is attenuated by the network. By virtue of the 82-cycle attenuation in the negative feedback parallel T network 68, all frequencies other than 82 cycles are attenuated by the first stage of band-pass filter 10. For such purpose, the circuit constants may be as follows:

| Resistors | | Capacitors | |
|---|---|---|---|
| | megohm | | Microfarad |
| 70 | 0.1 | 73 | 0.02 |
| 71 | do 0.1 | 74 | 0.02 |
| 72 | ohms 27,000 | 75 | 0.04 |

The parallel T network 76, similarly coupled between the input and output circuits of tube 16 and connected to the anode circuit by blocking condenser 77, attenuates a frequency of 98 cycles. By virtue of the 98-cycle attenuation in the negative feedback parallel T network 76, all frequencies other than 98 cycles are attenuated by the second stage of band-pass filter 10. For such purpose, the network constants may be as follows:

| Resistors | | Capacitors | |
|---|---|---|---|
| | ohms | | Microfarad |
| 78 | 82,000 | 81 | 0.02 |
| 79 | 82,000 | 82 | 0.02 |
| 80 | 20,000 | 83 | 0.04 |

By virtue of the successive attenuation of frequencies other than 82 and 98 cycles in the respective stages of the band-pass filter 10, there is produced a substantially constant transmission of signals within the range of 80 cycles to 100 cycles.

The parallel T network of either or both stages the filter 10 may be replaced by a parallel $\pi$ or a bridged T network, similarly to afford a band-pass of approximately 80 to 100 cycles—the range of signal frequencies corresponding with the range of tie-line load deviation.

The anode current of the limiter-amplifier tubes 15, 16 of filter 10 is supplied from the regulated power supply 13, the B terminals of the filter and power supply being connected by a conductor omitted from Fig. 1 for clarity. The heaters of tubes 15, 16 may be energized from the secondary winding 85 of transformer T₂ of the power supply.

In recapitulation, the filter 10 excludes passage of frequencies outside of the band of 80 to 100 cycles and for all magnitudes thereof from about 0.5 volt to 13 volts provides a constant output voltage of about 11 volts plus or minus 0.5 volt.

By way of specific example and supplemental discussion of converter 11, the wave shaping amplifier tubes 86 and 87 may be of the dual-triode 6N7 type; the amplifier tube 88 may be of the dual-triode 6F8 type with corresponding elements connected in parallel; and the output rectifier tube 89 may be of the dual-diode 6H6 type. This converter circuit produces a direct-current output which varies with the frequency or with the repetition rate of pulses applied to the converter input but is independent of their amplitude throughout the range of about 10 to 25 volts for the signal frequencies of 80 to 100 cycles and throughout the range of about 15 to 25 volts for the standardizing frequency of 60 cycles.

The first wave shaping amplifier 18 converts the signal input wave or pulse whether it be sinusoidal, triangular, or other shape, to a square wave which is differentiated by network 90, 91 to provide for the second wave shaping amplifier a pulse input which to appreciable extent is independent of the amplitude and waveform of the input signal. The second shaping amplifier 19 provides output pulses whose average value is substantially independent of the amplitude and waveform of the input to the converter and of average value dependent only upon the frequency or the repetition rate of input pulses. The subsequent amplifier stage 20 broadens the pulses for enhanced direct-current output. The rectifier stage 21 further increases the average value of the direct-current output of the converter as applied to the measuring instrument 12.

The anode voltage of the converter-amplifier tube 88 and the voltage applied to the measuring and standardizing network including slidewires 23 and 31 are both supplied from the same point A of voltage divider 92 of the power supply 13 so to minimize the effect of any changes in the anode supply voltage upon accuracy of the measurements. The anode voltage of wave shaping amplifier tubes 86, 87 of converter 11 is supplied from point C of the power supply at potential held constant by the gaseous discharge tube 93 which may be of the VR150 type.

The heaters of all converter tubes, except rectifier 89, may be energized from secondary winding 85 of transformer T₂. The heaters of rectifier 21 and of tube 54 of the time-delay network may be energized from secondary winding 98 of transformer T₁. The heater current of rectifier 21 is maintained constant, as above described, under control of switch $S_c$ and resistor 63 during the intervals of desensitization of the time-delay tube 54. When rectifier tube 89 is replaced, recalibration of the 60-cycle balance point of the measuring system is usually necessary.

The power supply 13 may be of any suitable type which produces a direct-current output voltage of desired magnitude throughout a range of from about 90 to 135 volts input to transformer T₂. In the particular power supply shown, the output circuit of the high-voltage rectifier tube 94, which may be of the 5U4 type, includes beyond the smoothing filter 99 a series-regulator tube 95, which may be of the 6L6 type, and a shunt regulator tube 96, which may be of the 6SQ7 type. The cathode potential of the shunt regulator tube 96 may be held constant by a gaseous discharge tube 97, similar to tube 93.

From the earlier general discussion, it shall be understood the invention is not limited to a telemetric receiver consisting of components specifically described, and that changes and modifications may be made within the scope of the appended claims.

What is claimed is:

1. A self-standardizing measuring instrument including a measuring slidewire, a standardizing slidewire, a motor normally responsive during successive recording and standardizing periods to effect adjustment of said measuring and standardizing slidewires respectively, switching means operated intermittently to shift between measuring and standardizing, and a time-delay network controlled by said switching means temporarily to disable said motor.

2. An arrangement as in claim 1 in which the delay network includes an electronic tube whose anode current controls a disabling relay for the motor, in which the measuring instrument is preceded by an input network including electronic tubes energized from a source common to the delay network tube, and in which the aforesaid disabling relay controls the load upon said source in compensation for the effect upon said input tubes of large changes in anode current of the delay tube.

3. A self-standardizing measuring instrument including a measuring slidewire, a standardizing slidewire, a motor normally responsive during successive recording and standardizing periods to effect adjustment of said measuring and standardizing slidewires respectively, monitoring means for the instrument standard including switching means positioned in accordance with the standard, and a second switching means operated intermittently to shift between measuring and standardizing, said first-named switching means cooperating with said second-named switching means to disable said motor at least for any part of said standardizing period for which said standard is found by said monitoring means to be deficient.

4. A self-standardizing measuring instrument including a measuring slidewire, a standardizing slidewire, a motor normally responsive during successive recording and standardizing periods to effect adjustment of said measuring and standardizing slidewires respectively, switching means operated intermittently to shift between measuring and standardizing, monitoring means for the measuring standard including switching means positioned in accordance with the standard, and a time-delay network controlled by both switching means.

5. A telemetric receiver comprising an electronic converter normally connected to a source of signals of varying frequency to convert them into direct current of magnitudes corresponding with different frequencies and substantially independent of variations in magnitude and waveform of said signals; a measuring instrument including a measuring slidewire traversed by direct current from a source thereof and normally adjustable to balance the variable direct-current output of said electronic converter, and motive means for adjusting said slidewire to balance the varying direct-current output of said electronic converter; and means for compensating for changes in the characteristics of said converter including electronic tubes comprising a calibrating slidewire adjustable to vary the current from said direct-current source through said measuring slidewire, means intermittently operated to couple said calibrating slidewire to said motive means, and switching means operated concurrently with said coupling means for connecting said converter to a source of standard frequency for adjustment of said calibrating slidewire by said motive means to balance the direct-current output of said converter corresponding with said standard frequency.

6. A time-delay network including a thyratron whose anode-cathode circuit includes a source of alternating current and a translating device, a source of direct current, a biasing network connected to said source and included in the grid-cathode circuit of said thyratron, a capacitor included in said biasing network, and switching means effective during movement from one to another circuit-controlling position momentarily to provide a discharge path for said capacitor so to deenergize said translating device until said capacitor recharges.

7. The combination with the delay network of claim 6 of a self-standardizing recorder in which the switching means of the delay network operates concurrently with the transitions from recording to standardizing.

8. The combination defined by claim 7 additionally including a monitor for checking the recorder standard and a switch controlled by said monitor and associated with said delay network to preclude recharging of said capacitor when said standard is deficient.

WILLIAM EARL PHILLIPS.
EDWARD J. CRANCH.

REFERENCES CITED

The following references are of record in the file of this patent:

UNITED STATES PATENTS

| Number | Name | Date |
| --- | --- | --- |
| 2,421,991 | Carriere | June 10, 1947 |
| 2,442,578 | Audier | June 1, 1948 |
| 2,483,364 | Ehret | Sept. 27, 1949 |
| 2,489,999 | Cherry | Nov. 29, 1949 |